(12) United States Patent
Ottamalika

(10) Patent No.: US 7,818,274 B1
(45) Date of Patent: Oct. 19, 2010

(54) AUTOMATIC GENERATION OF EVENT-HANDLING RULES FROM SYSTEM LOG ENTRIES

(75) Inventor: Iqlas Maheen Ottamalika, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 11/524,725

(22) Filed: Sep. 20, 2006

(51) Int. Cl.
G06F 17/00 (2006.01)
G06N 5/00 (2006.01)

(52) U.S. Cl. ....................................... 706/45
(58) Field of Classification Search .............. 706/45
See application file for complete search history.

(56) References Cited

U.S. PATENT DOCUMENTS

| | | | |
|---|---|---|---|
| 6,272,537 B1 * | 8/2001 | Kekic et al. ............... | 709/223 |
| 6,868,319 B2 * | 3/2005 | Kipersztok et al. .......... | 701/29 |
| 7,343,604 B2 * | 3/2008 | Grabarnik et al. ........... | 719/313 |
| 2006/0041935 A1 * | 2/2006 | Conley et al. ............... | 726/11 |
| 2006/0075308 A1 * | 4/2006 | Haselden et al. ............ | 714/39 |

* cited by examiner

Primary Examiner—Donald Sparks
Assistant Examiner—Li-Wu Chang
(74) Attorney, Agent, or Firm—Stolowitz Ford Cowger LLP

(57) ABSTRACT

Approaches to automatic generation of event handling rules are presented. In one approach, a system for automatic event handling rule generation includes a system log file, containing a syslog entry. A rule module is used to interpret the syslog entry. An entry format depository is available to the rule module, and contains a description of the general format corresponding to the syslog entry. An entry causation depository is available to the rule module, and contains both a cause for the syslog entry's creation, and a solution template corresponding to the syslog entry. The rule module uses the general format to parse information from the syslog entry, and uses that information to locate the cause and a solution template. The rule module then uses the information from the syslog entry to complete the solution template, thereby generating a rule to alter the behavior which caused the syslog entry to be created.

19 Claims, 8 Drawing Sheets

Network Management System 600

Network 200

Syslog 300

| Severity | Date | Time | Syslog ID | Source IP | Destination IP | Description |
|---|---|---|---|---|---|---|
| ⊙ 7 | Jan 20 2004 | 11:04:20 | 609002 | 100.1.1.100 | | Teardown local-host outside:100.1.1.100 duration 0:00:30 |
| ⊙ 7 | Jan 20 2004 | 11:04:20 | 609002 | 10.1.1.100 | | Teardown local-host inside:10.1.1.100 duration 0:00:30 |
| △ 6 | Jan 20 2004 | 11:04:20 | 302014 | 100.1.1.100 | 10.1.1.100 | Teardown TCP connection 2145 for outside:100.1.1.100/80 to inside |
| △ 6 | Jan 20 2004 | 11:03:50 | 302013 | 100.1.1.100 | 10.1.1.100 | Built outbound TCP connection 2145 for outside:100.1.1.100/80 (100 |
| ⊙ 6 | Jan 20 2004 | 11:03:50 | 609001 | 100.1.1.100 | | Built local-host outside:100.1.1.100 |
| ⊙ 6 | Jan 20 2004 | 11:03:50 | 609001 | 10.1.1.100 | | Built local-host inside:10.1.1.100 |
| ⊡ 0 | Jan 20 2004 | 11:03:50 | 106100 | 10.1.1.100 | 100.1.1.100 | access-list 100 permitted top inside/10.1.1.100(1067) -> outside/100 |
| △ 6 | Jan 20 2004 | 11:03:24 | 302014 | 171.69.116.61 | 172.23.59.108 | Teardown TCP connection 2144 for mgmt:171.69.116.61/4803 to NP |
| △ 6 | Jan 20 2004 | 11:03:24 | 725007 | 171.69.116.61 | | SSL session with client mgmt:171.69.116.61/4803 terminated. |
| △ 6 | Jan 20 2004 | 11:03:22 | 302014 | 171.69.116.61 | 172.23.59.108 | Teardown TCP connection 2143 for mgmt:171.69.116.61/4802 to NP |
| △ 6 | Jan 20 2004 | 11:03:22 | 302014 | 171.69.116.61 | 172.23.59.108 | Teardown TCP connection 2142 for mgmt:171.69.116.61/4801 to NP |
| △ 6 | Jan 20 2004 | 11:03:22 | 605005 | 171.69.116.61 | | Login permitted from 171.69.116.61/4803 to mgmt:172.23.59.108/http |
| △ 6 | Jan 20 2004 | 11:03:22 | 725002 | 171.69.116.61 | | Device completed SSL handshake with client mgmt: 171.69.116.61/48 |
| △ 6 | Jan 20 2004 | 11:03:22 | 725003 | 171.69.116.61 | | SSL client mgmt171.69.116.61/4803 request to resume previous se |
| △ 6 | Jan 20 2004 | 11:03:22 | 725001 | 171.69.116.61 | | Starting SSL handshake with client mgmt:171.69.116.61/4803 for TL |
| △ 6 | Jan 20 2004 | 11:03:22 | 302013 | 171.69.116.61 | 172.23.59.108 | Built inbound TCP connection 2144 for mgmt:171.69.116.61/4803 (17 |
| △ 6 | Jan 20 2004 | 11:03:22 | 725007 | 171.69.116.61 | | SSL session with client mgmt:171.69.116.61/4802 terminated. |
| ⊙ 7 | Jan 20 2004 | 11:03:22 | 111009 | | | User 'enable_15' executed cmd: show running-config all class-map |
| △ 6 | Jan 20 2004 | 11:03:22 | 605005 | 171.69.116.61 | | Login permitted from 171.69.116.61/4802 to mgmt:172.23.59.108/http |
| △ 6 | Jan 20 2004 | 11:03:22 | 725002 | 171.69.116.61 | | Device completed SSL handshake with client mgmt: 171.69.116.61/48 |
| △ 6 | Jan 20 2004 | 11:03:22 | 725003 | 171.69.116.61 | | SSL client mgmt:171.69.116.61/4802 request to resume previous se |
| △ 6 | Jan 20 2004 | 11:03:22 | 725001 | 171.69.116.61 | | Starting SSL handshake with client mgmt:171.69.116.61/4802 for TL |

%PIXIASA-4-106100: access-list acl_ID (permitted | denied | est-allowed) protocol interface_name/source_address(source_port) - > interface_name/dest_address(dest_port) hit-cnt number ((first hit | number-second interval))

If you configured the log option for the access-list command, the packets matched an ACL statement. The message level depends

Figure 4

GUI 400

Rule Generation GUI 500

Network Management System 600

AUTOMATIC GENERATION OF EVENT-HANDLING RULES FROM SYSTEM LOG ENTRIES

BACKGROUND

1. Field of the Invention

Embodiments of the present invention pertain to event handling devices that generate event logs, and specifically to generating rules to handle events.

2. Related Art

Event handling devices are common. Such devices apply a particular set of rules to a given situation, in that particular set of circumstances arises, one or another of the rules in the rule set is applicable to the circumstances. One area in which these event handling devices are often used is that of network security appliances, for example, an ASA/PIX/FWSM firewall.

Network security appliances are connected to a network, or several networks, through designated interfaces. Network traffic flow through the security devices is governed by the application of a set of related rules, or an interface instruction set. These interface instruction sets in turn, are made up of many rules. The rules specify, for example, what traffic is allowed to go where, and using which protocol. Because the application of these rules to network traffic is of interest, the outcome of each individual application of rule, called an event, is recorded in a system log, or syslog.

Many hundreds of types of syslogs are likely to be generated by a complex event handling device, such as a firewall. While some of these syslogs are routine notifications of intended applications of rules, others represent some error or misconfiguration, often in the network or the device itself. In order to troubleshoot these errors, the syslogs must be examined. In some cases, once a syslog corresponding to an error is identified, a new rule for the event handling device must be crafted by a user, to address this particular situation.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a depiction of a graphical user interface (GUI), in accordance with one embodiment of the present invention.

DETAILED DESCRIPTION

Figure 1:
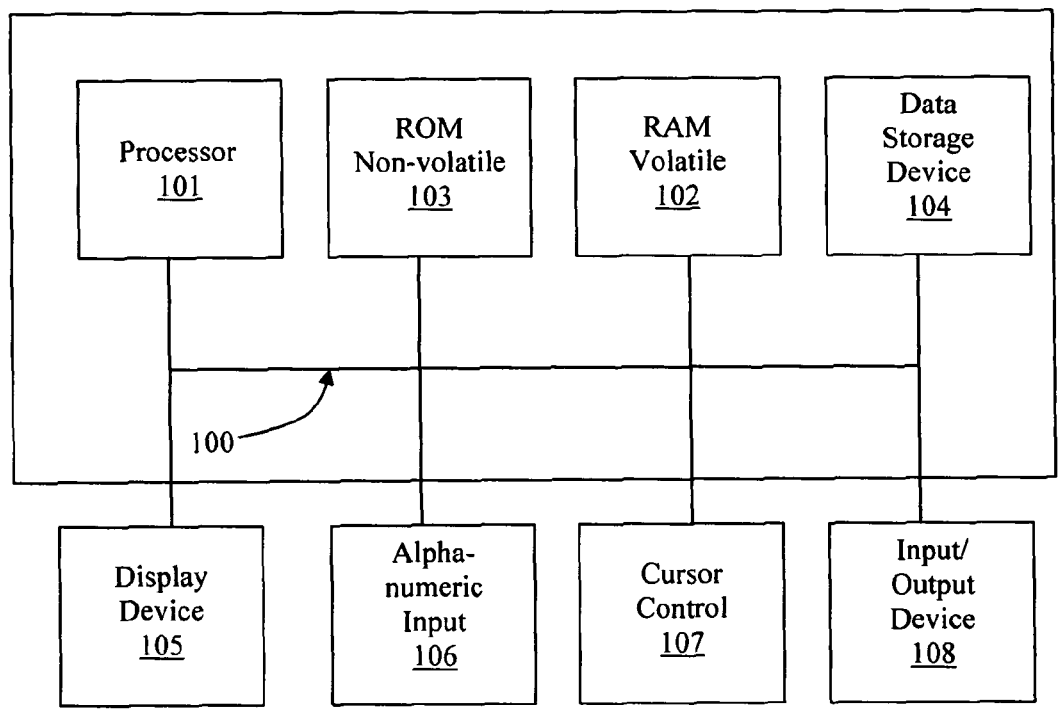
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Exemplary Computer System

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network. Input/Output device 108 may also include a Universal Serial Bus (USB) interface for connected peripherals including security peripherals, such as a token device. In one embodiment, a USB "flash memory" device may contain a secret or accept a secret from one device and act as a "courier" to transport that secret to another device. In such an embodiment, the two devices are said to be securely "introduced" for the purposes of establishing a secure association based on the secret from the USB memory.

Syslog Entry Generation

Embodiments of the present invention are well suited for use across many fields of application. In particular, embodiments of the present invention are applicable to situations where an event handling device creates a log or logs of event activity, and where an administrator may wish to create new rules for handling events based upon these logs. One such embodiment, which will be used in the following description to illustrate some features of the present invention, is a network security device, such as an ASA/PIX/FWSM firewall, which monitors traffic through a network and applies rules to govern that traffic flow.

Figure 2:
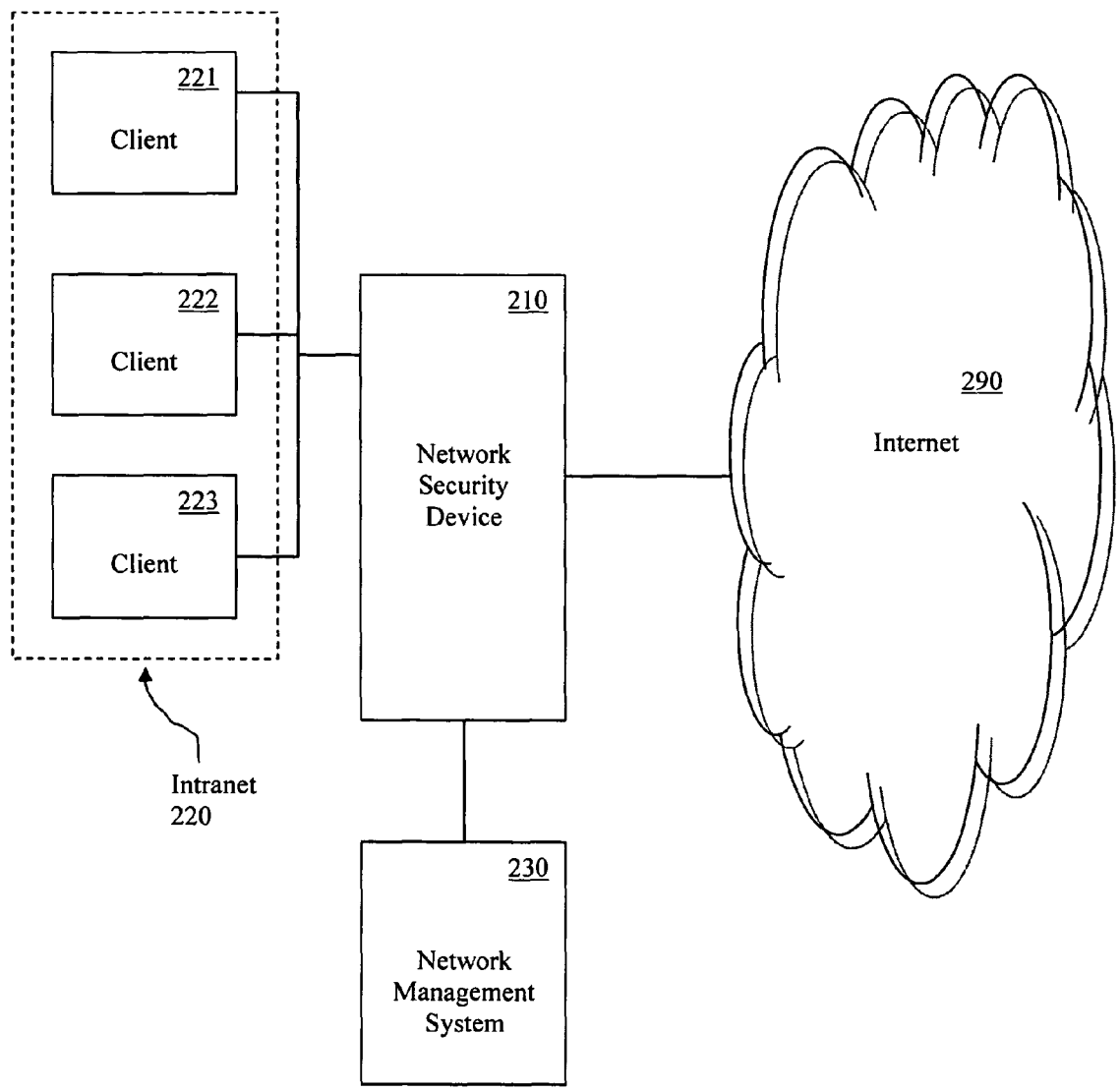
FIG. 2 is a depiction of an exemplary network 200 upon which embodiments of the present invention may be implemented.

With reference now to FIG. 2, an exemplary network 200 is depicted, in accordance with one embodiment of the present invention. It is appreciated that while exemplary network 200 is depicted as having certain components, embodiments of the present invention may be adapted other networks, having different components, hierarchies, or organizations.

In the depicted embodiment, exemplary network 200 is shown as incorporating an intranet 220. Intranet 220 is made up of a number of client computers, e.g., client computers 221, 222, and 223. Exemplary network 200 is also shown as incorporating the Internet 290. Between intranet 220 and Internet 290, the depicted embodiment includes network security device 210. Network security device 210, in some embodiments, manages traffic flow between intranet 220 and Internet 290; in some embodiments, network security device 210 also manages traffic flowing throughout intranet 220.

Network security device 210 manages traffic through the application of various rules, e.g., rules for allowing or denying traffic to specific sites on the Internet, or rules preventing access to client computers within intranet 220 from outside sources. In some embodiments, under particular situations, the application of a rule may result in the creation of a system log entry, or syslog. These syslogs are valuable to a network administrator, e.g., for monitoring traffic flow within the network, and to identify errors or misconfigurations in network security device 210. In the depicted embodiment, exemplary network 200 includes network management system 230, where these syslogs can be stored and viewed. In some embodiments, network management system 230 can also be used to change the configuration of network security device 210, e.g., by uploading new or modified rules.

In some embodiments, a syslog entry is designed to convey all of the necessary information in as little space as possible. To that end, specific formats are used for different types of syslog entries. For example, one syslog entry generated as a result of violation of a particular access rule will conform to the same format as another entry created for the same reason. However, both rules would follow a different format than an entry created for another reason. In this way, the position of information within a syslog entry provides context for the value of the entry itself. Table 1, below, presents an exemplary syslog entry, and explains the format for that entry.

TABLE 1

| syslog entry |
|---|
| 106100: access-list my-fw-rule permitted tcp inside/192.168.141.21(32811) -> outside/198.133.219.251 (80) hit-cnt 1 |

In the exemplary syslog entry provided, 106100 identifies the type of syslog entry that follows, in that every syslog entry of type 106100 conforms to the same format. The keyword "access-list" appears in all syslog entries of type 106100. The action taken, permitted, appears next, indicating that the requested traffic was permitted to occur. The protocol of the traffic, tcp, is specified. Next, the originating interface, inside, and the originating IP address and port, 192.168.141.21(32811), are identified. The destination interface, outside, and the destination IP address and port, 198.133.219.251(80), are given. Hit-cnt 1 identifies the number of times this particular rule has been invoked.

Figure 3:
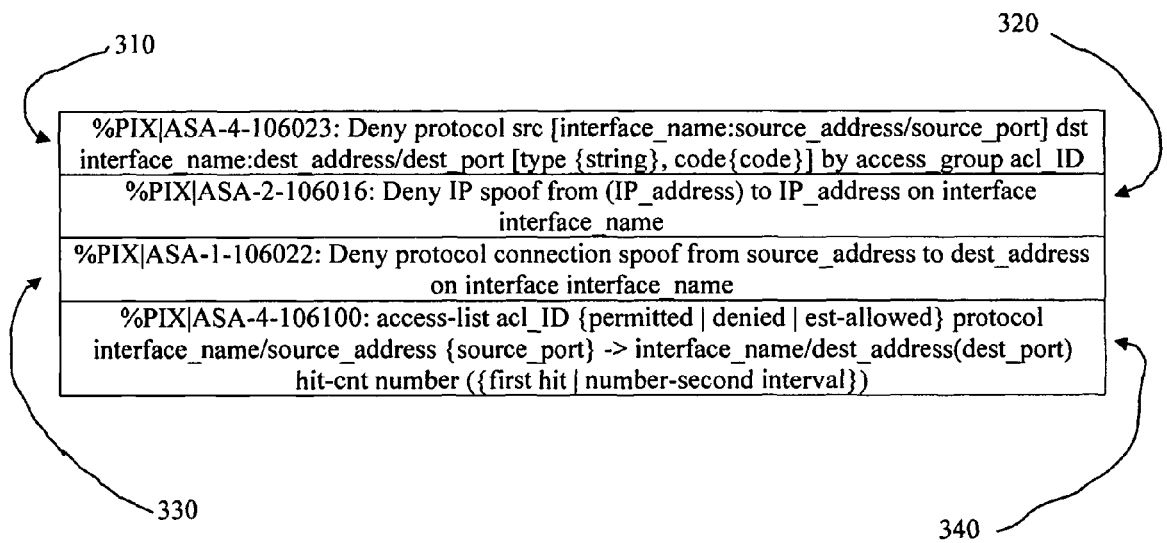
FIG. 3 is a depiction of an exemplary syslog, in accordance with one embodiment of the present invention.

With reference now to FIG. 3, an exemplary syslog 300 is depicted, in accordance with one embodiment. Exemplary syslog 300 depicts for exemplary syslog entries, entries 310, 320, 330, and 340. Each of these exemplary entries would result from different situations.

Entry 310 would be generated if no explicit access control list (ACL) is configured to allow the indicated traffic. If, with reference to FIG. 2, client 221 was attempting to reach a particular site on Internet 290, and no ACL was configured to allow his traffic, a syslog entry of this format would be generated by network security device 210. If the administrator wished to allow this traffic to happen in the future, the administrator would need to create an appropriate ACL and appliance to the correct interface within network security device 210.

Entry 320 would be generated if some attempt were being made to spoof an IP address. Often, such actions are indicators of some network attack. In this situation, an administrator could configure the network security device to mitigate the harm.

Entry 330 would be generated by a network security device experiencing a spoof attack directed at a server protected by the device.

An entry of the format of entry 340 will be created with the "permitted" option when traffic is allowed to pass through the network security device. If this is a misconfiguration, or an administrator wished to deny the traffic in the future, an ACL could be created with the "deny" option, and applied to the appropriate interface; alternatively, a "shun" rule could be created to deny the traffic.

For the above described entries, and for many similar scenarios, an administrator will want to take some corrective action. At present, such an action involves checking through the syslog entries to find an entry corresponding to the current problem, reading the entry to determine all of the appropriate information, and using that information to craft a rule to apply to the event handling device.

Embodiments of the present invention simplify the administrator's task by allowing the administrator to simply select the syslog entry, and then automatically generating a corresponding rule. In some embodiments, generation and application of the rule can be accomplished in a single step, e.g., a single mouse click. In other embodiments, the rule is automatically generated, and a user has the opportunity to review and adjust the rule before it is implemented. In further embodiments, the rule is automatically generated, and the user can determine when or whether to apply the rule.

Automatic Rule Generation

With reference now to FIG. 4, a sample graphical user interface (GUI) 400 is shown, in accordance with one embodiment. While GUI 400 is shown as incorporating specific, enumerated features, it is understood that embodiments of the present invention are well suited to applications involving many different types of interfaces, both graphical and otherwise. Additionally, embodiments of the present invention are well suited to interface is having different display and interface elements.

GUI 400 is shown as being divided into a syslog display 410 and a syslog information display 420. In the depicted embodiment, syslog display 410 shows entries in the syslog for an event handling device, e.g., a network security device. While the information shown for each syslog entry will vary across different embodiments, some embodiments will show the date and time of the event that triggered the entry's creation, an identifier of the type of syslog entry, e.g., a syslog ID, and provide a listing of the entry itself. Some embodiments, including the depicted embodiment, extract some information from the syslog entry and make it more readily apparent, e.g., source IP and destination IP.

Syslog information display 420, shown in the depicted embodiment as the bottom portion of the window, provides information about a selected syslog entry. If entry 415 is selected, for example, syslog information display 420 provides information relating to entry 415. In the depicted embodiment, for example, syslog information display 420 shows the format of a syslog entry of type 106100. Such information can be retrieved from many different types of sources, in different embodiments, e.g., an XML file or database containing a listing of some or all syslog entry formats, and accessible through the identifier for a particular syslog entry.

In some embodiments, syslog information display 420 also provides some information about the likely cause of the syslog entry. For example, a syslog entry of type 106100 can be created if the "log" option is configured for a particular access list, and some traffic matching an ACL statement passes through the network security device.

In some embodiments, a user can use a syslog viewer interface, such as GUI 400, to automatically generate a new rule for the event handling device. In several such embodiments, the user selects a particular syslog entry, reflecting event handling behavior that the user would like to alter. Such selection can be accomplished in numerous ways, in different embodiments; in one embodiment, the user uses a computer mouse to click on a particular syslog entry, e.g. entry 415.

Figure 5:
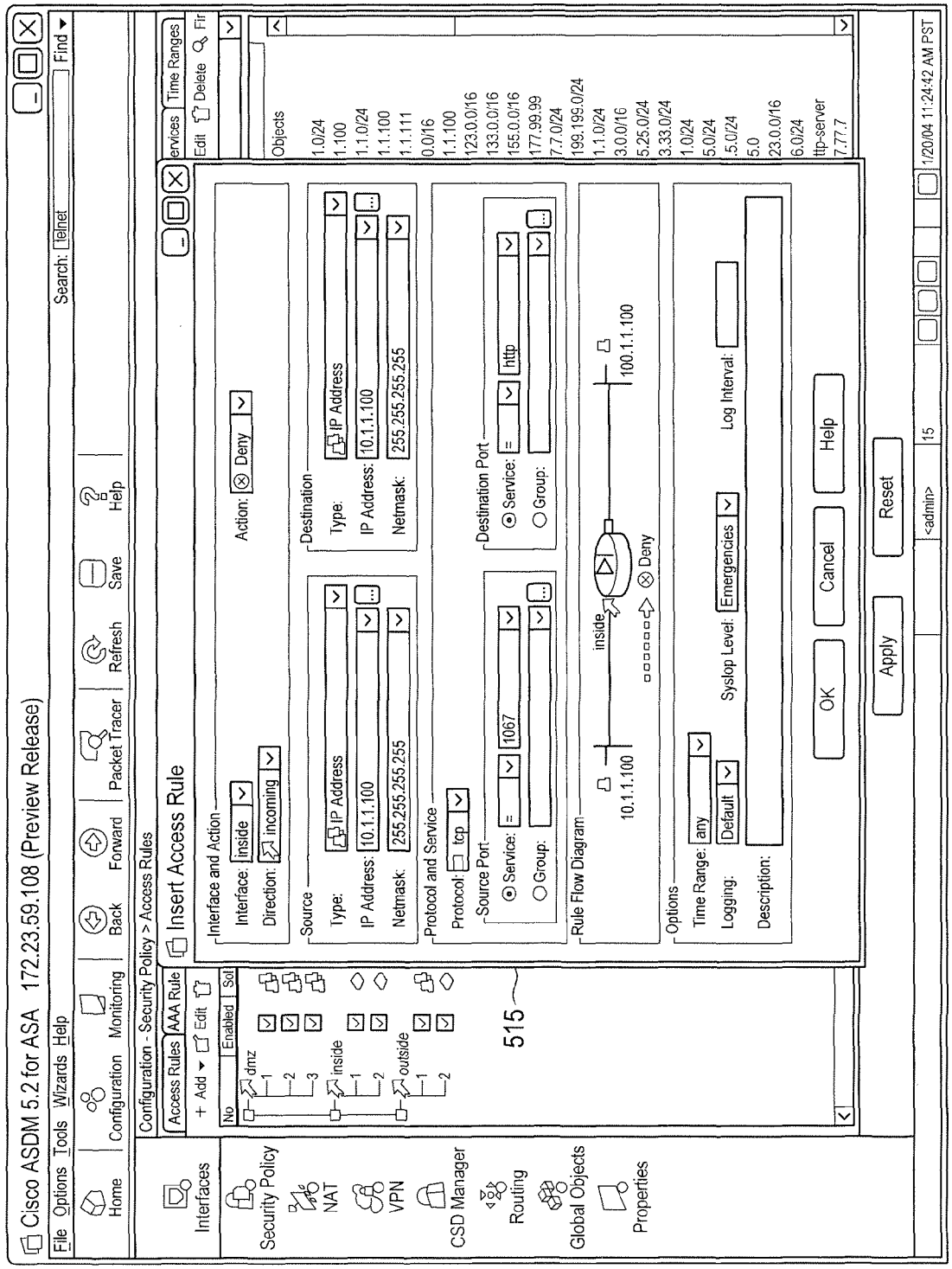
FIG. 5 is a depiction of rule generation GUI, in accordance with one embodiment of the present invention.

With reference now to FIG. 5, a rule generation GUI 500 is depicted, in accordance with one embodiment. While rule generation GUI 500 is shown as incorporating specific, enumerated features, it is understood that embodiments of the present invention are well suited to applications involving many different types of interfaces, both graphical and otherwise. Additionally, embodiments of the present invention are well suited to interface is having different display and interface elements.

FIG. 5 shows rule generation GUI 500 as including rule interface 515. In one embodiment, a user selects a syslog entry, e.g., by using a mouse to click on entry 415 within syslog display 410 in GUI 400, and rule interface 515 is displayed. In the depicted embodiment, rule interface 515 includes a number of settings, e.g., interface, action, direction, etc., and is preconfigured to reverse the behavior of the syslog entry selected by the user. For example, where entry 415 of FIG. 4 reflects permitted traffic to flow from source 10.1.1.100 attached to the in said interface to 100.1.1.100 attached to the outside interface, rule interface 515 is preconfigured to create a rule that will deny such traffic. In some embodiments, the user is given an opportunity to make alterations to the automatically generated rule, e.g., by altering some or all of the preconfigured settings. In other embodiments, rule creation and implementation is accomplished by the initial act of selecting a syslog entry, e.g., a single click of the mouse on a syslog entry will automatically generate a corresponding rule, and upload it to the event handling device.

Figure 6:
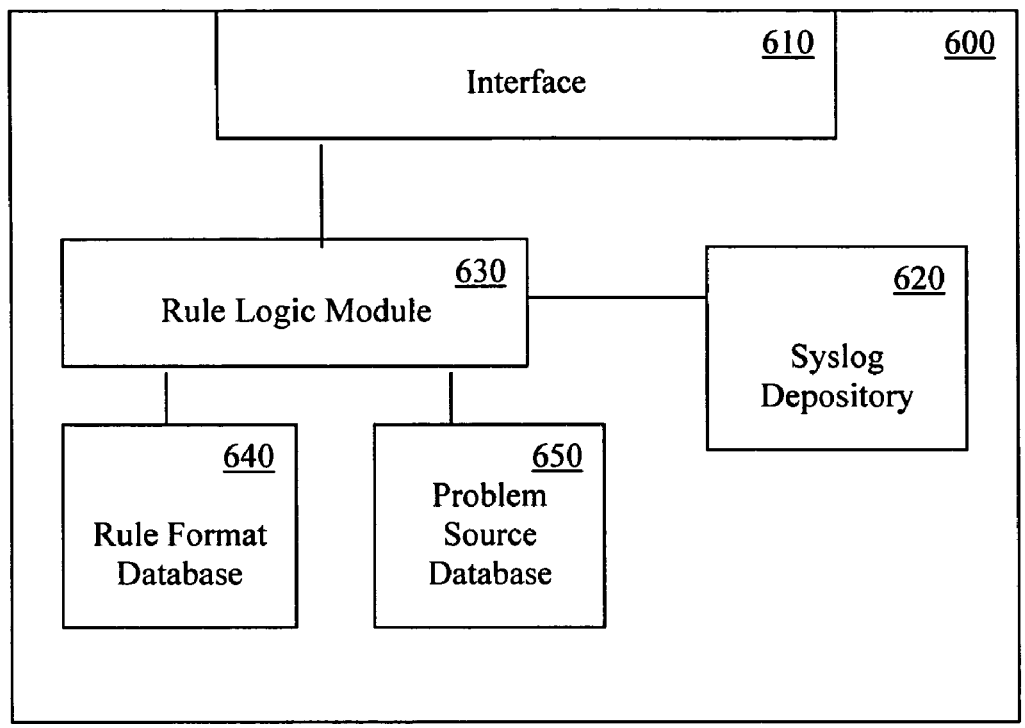
FIG. 6 is a block diagram of a network management system, in accordance with one embodiment of the present invention.

With reference now to FIG. 6, a network management system 600 is depicted, in accordance with one embodiment of the present invention. While network-management system 600 is shown as incorporating specific, enumerated features, it is understood that embodiments of the present invention are well suited to applications involving many different types of interfaces, both graphical and otherwise. Additionally, embodiments of the present invention are well suited to interface is having different display and interface elements.

In the depicted embodiment, network management system is shown as including an interface 610. In some embodiments, network management system 600 is used to implement a user interface for interaction with a system log for an event handling device, and for creating new rules to apply to the event handling device. In several such embodiment, a graphical user interface, such as GUI 400 and/or rule generation GUI 500, is used to interact with network management system 600. In other embodiments, alternative interfaces are used.

As shown in FIG. 6, network management systems hundred includes a syslog depository. In some embodiments, an event handling device, such as a network security device like network security device 210 of FIG. 2, will transmit syslog entries to network-management system 600. In other embodiments, network management system 600 accesses the syslog remotely, e.g., stored on the event handling device directly. In other embodiments, other approaches are utilized.

Network-management system 600 is also shown as including rule logic module 630. Rule logic module 630, in some embodiments, allows for the implementation of automatic rule generation from syslog entries. In several such embodiments, an approach similar to that described above, with reference to FIGS. 4 and 5, is utilized. In other embodiments, a different approach is used.

Network management system 600 is also shown as including to data storage elements, rule format database 640, and problem source database 650. In some embodiments, the function served by these two separate databases can be combined into single database; and other embodiments, additional data storage approaches are utilized.

Rule format database 640, in some embodiments, is used by rule logic module 630 in parsing a particular syslog entry. Rule format database 640, in these embodiments, stores the format of some or all valid syslog entries. Given a unique identifier for particular type of syslog entry, a specific format for such an entry can be retrieved from rule format database 640. For example, if given a syslog entry having a syslog ID of 106100, such as entry 415 of FIG. 4, the format for an entry of that type can be retrieved, e.g., as shown in syslog information display 420. In some embodiments, this information can then be used by rule logic module 632 parse or otherwise extract information from the syslog entry. Given the general format of a type of syslog entry, rule logic module 430 is able to determine the specifics of the information contained in a particular syslog entry of that type.

Problem source database 650, in some embodiments, is used by rule logic module 630 to determine what caused a particular syslog entry to be generated. For example, a syslog entry of a particular type may be the result of the lack of a particular type of rule, such as ACL prohibiting traffic from a particular source to a particular destination; a different syslog entry of a different type may be the result of attempted spoofing of a network security device. Problem source database 650, in such embodiment, provides a correlation between types of syslog entries, and the likely cause of the sentries, e.g., the lack, presence, or misapplication of a particular type of rule for the event handling device. In some embodiments, this correlation can be determined solely from the type of syslog entry created, e.g., from the syslog ID. In other embodiments, this correlation requires both the syslog ID, and information parsed from the syslog entry itself, e.g., by using the general format of the syslog entry and the specific entry itself to extract information from the entry. In some embodiments, problem source database 650 is used by rule logic module 632 determine the nature of the problem to be solved, and hence the nature of the type of rule to be generated.

Method of Generating Rules from a Syslog Entry

Figure 7:
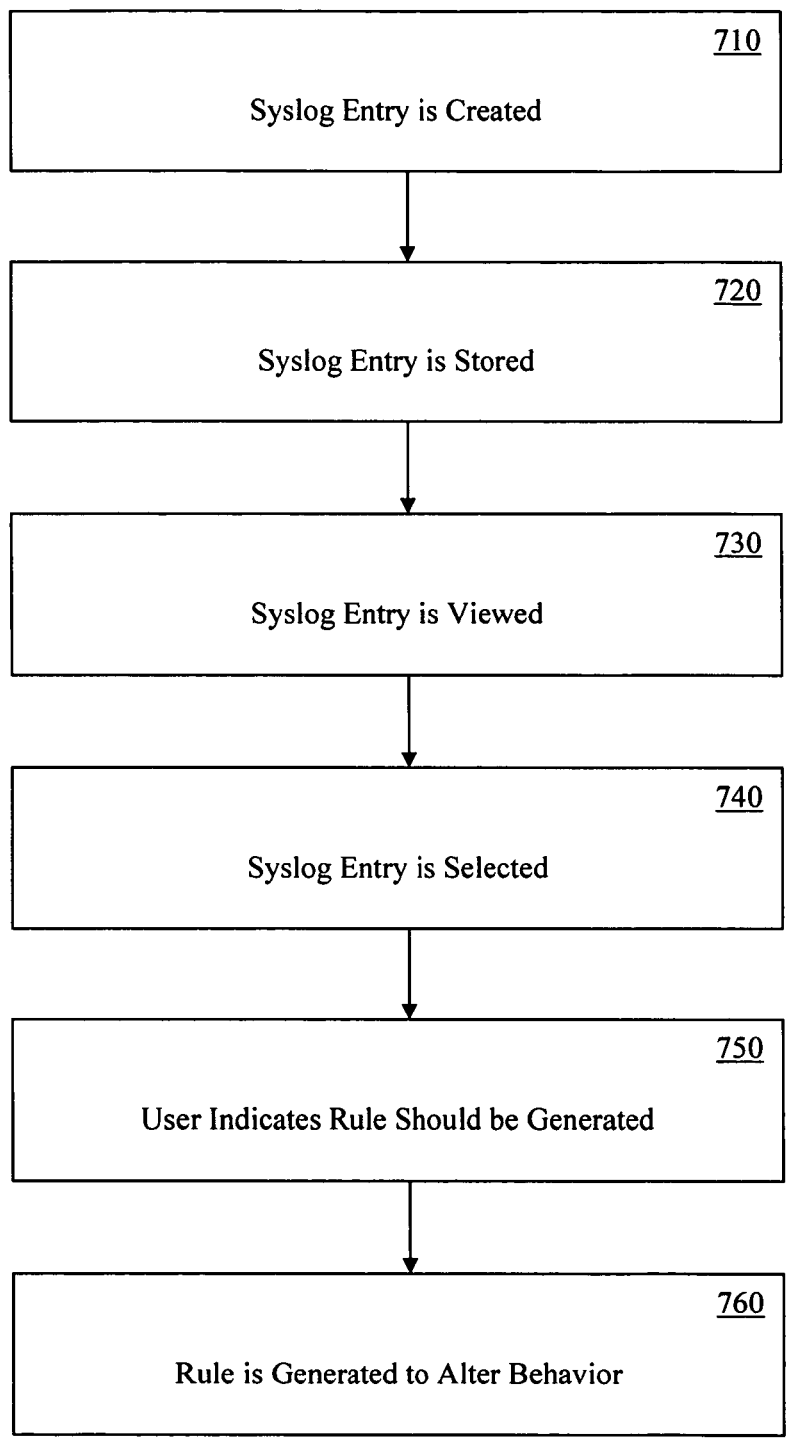
FIG. 7 is a flowchart of a method of generating a rule from a syslog entry, in accordance with one embodiment of the present invention.

With reference now to FIG. 7, a flowchart 700 of a method of generating a rule from a syslog entry presented, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710, a syslog entry is created. In some embodiments, the syslog entry is the result of an event handling device, such as a network security device, applying a rule to an event. In some embodiments, the syslog entry includes an identifying number or tank, which serves to identify which rule or event caused the syslog entry to be generated. For example, with reference to FIG. 2, network security device 210 applies a rule to some event, and creates a syslog entry, which has a syslog ID number.

With reference to step 720, the syslog entry is stored as part of a system log. In some embodiments, this involves the syslog entry being stored in a depository or data storage of some type; such a storage may be part of the event handling device itself, part of some management system for the event handling device, or in some other location. For example, the syslog entry created a network security device 210 is passed to network-management system 230, and stored in a syslog database that is part of network-management system 230.

With reference now to step 730, the syslog entry is viewed using a user interface. In some embodiments, the user interface maybe graphical in nature, e.g., GUI 400; in other embodiments, the user interface may take other forms.

With reference now to step 740, the syslog entry is selected by a user using the user interface. In some embodiments, selection is accomplished using a computer input device, e.g., clicking with a mouse, or selecting an entry using keyboard commands; in other embodiments, selection is indicated in other ways. For example, with reference to FIG. 4, a user uses the computer mouse to select entry 415.

With reference now to step 750, the user indicates that a rule should be generated to address the selected syslog entry. In some embodiments, this is accomplished via an additional interactive step, e.g., present a keyboard button, clicking on an interactive element of the GUI, or double-clicking on the selected syslog entry. For example, with reference to FIG. 4, the user double clicks with the computer mouse on entry 415.

In other embodiments, the step is combined with step 740, such that users selecting a syslog entry, or selecting the syslog entry in a particular manner, will indicate that a rule should be generated.

With reference now to step 760, a rule is generated to alter the behavior reflected by the selected syslog entry. In some embodiments, the default behavior is to create a rule that reverses the behavior indicated by the syslog entry. In other embodiments, a different default approach may be used. In some embodiments, a user may be able to indicate what action should be taken, with respect to automatic rule generation. For example, with reference to FIGS. 4 and 5, the rule generated in response to selection of entry 415 is to reverse the behavior which calls the creation of entry 415, as shown in rule interface 515.

In some embodiments, functionality of steps 740, 750, and 760 are combined into a single step, such that the act of selecting a particular syslog entry will cause a rule to be generated to alter the behavior reflected by the selected syslog entry. In one such embodiment, a user selects a particular syslog entry using a single click of a computer mouse, and a rule is automatically generated which reverses the behavior indicated. For example, with reference to FIGS. 4 and 5, a user selecting entry 415 would automatically cause a rule reversing that behavior to be generated.

Method of Automatic Rule Generation

Figure 8:
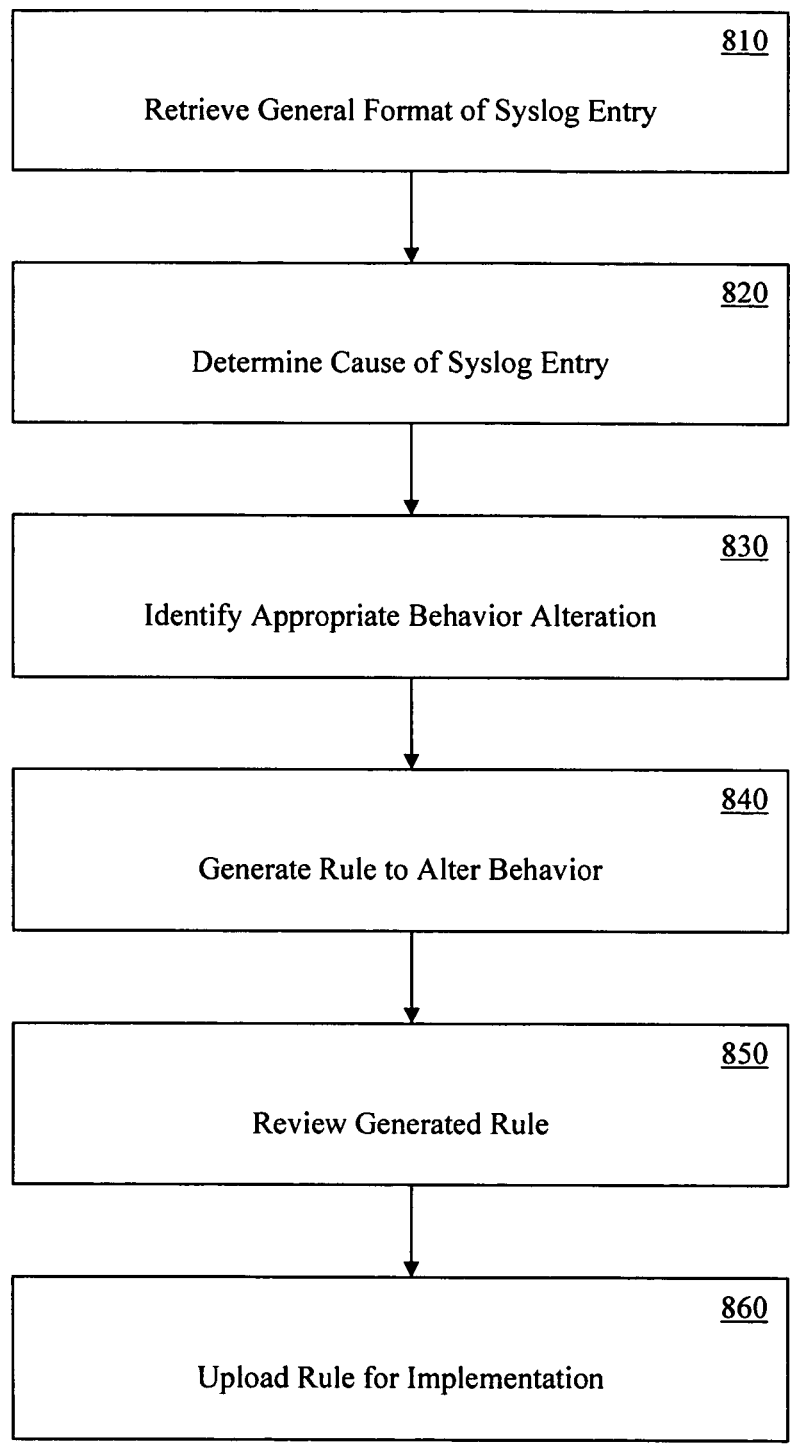
FIG. 8 is a flowchart of a method of automatic rule generation, in accordance with one embodiment of the present invention.

With reference now to FIG. 8, a flowchart 800 of a method of automatic rule generation is depicted, in accordance with one embodiment of the present invention. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference now to step 810, given a specific syslog entry, the general format for syslog entries of that type is retrieved. In some embodiments, each syslog entry has an identifier which identifies what type of syslog entry it is. Given that identifier, a database or similar data store can be searched for the general format of syslog entries of that type. In several embodiments, having the general format of the syslog entry allows the information within the entry to be understood. For example, with reference to FIGS. 4 and 6, entry 415 has a syslog ID of 106100. Given that ID, rule logic module 630 can search rule format database 640 to find a general format of syslog entries of type 106100. Given the general format of entries of type 106100, the information contained in entry 415 can be parsed and understood.

With reference now to step 820, the nature of the behavior which caused the syslog entry is determined. In some embodiments, this step is accomplished by searching a database of known behaviors, using information extracted from the syslog entry. In some of these embodiments, only the general type of syslog entries needed to determine the nature of the behavior, e.g., only the syslog ID is necessary to identify certain types of problems. In some other embodiments, information specific to the actual syslog entry is necessary, to identify the nature of the behavior. For example, rule logic module 630 searches problem source database 650, using information parsed from entry 415, in order to identify what behavior caused entry 415 to be created.

With reference now to step 830, an appropriate behavior alteration is identified. In some embodiments, once the nature of the behavior which caused the syslog entry is determined, a potential solution or rule can be crafted to the behavior. In some embodiments, such potential solutions are linked to their behaviors. For example, problem source database 650 includes both information about what behavior caused entry 415 be created, and a rule template to alter behavior of that type.

With reference now to step 840, a rule is generated to alter the behavior which caused the syslog entry to be created. In some embodiments, given the potential solution or template for a rule, the original syslog entry, and the general format for syslog entries of that type, the template can be automatically filled in, using information parsed from the syslog entry. For example, the rule template identified to alter behavior of the type indicated by entry 415 can be populated using information contained in entry 415, create a specific-case rule which alters specifically the behavior that created entry 415.

With reference now to step 850, the proposed rule can be reviewed, configured, or adjusted. In some embodiments, a user is given an opportunity to review and/or alter the automatically generated rule, before it is put into effect. For example, with reference to FIGS. 4 and 5, the rule auto generated to change the behavior which created entry 415 is displayed in rule interface 515, where it can be reviewed and modified. In some embodiments, this step is omitted, and rules, once automatically generated, are implemented.

With reference now to step 860, the rule is uploaded to the event handling device for implementation. In some embodiments, once a rule has been finalized, it is sent back to the event handling device which generated the original syslog entry, e.g., the network security device, where it can be applied. For example, once the rule in rule interface 515 is approved, he can be uploaded from network management system 230 to network security device 210.

Embodiments of the present invention are thus described. While the present invention has been described in particular embodiments, it should be appreciated that the present invention should not be construed as limited by such embodiments, but rather construed according to the following claims.

What is claimed is:

1. A system for automatic event handling rule generation, comprising:

an event handling device comprising memory and one or more processors for automatically handling events associated with an operation of one or more computers;

a system log file, comprising a specific syslog entry associated with a particular event;

a rule module, coupled to the system log file and including a solution template corresponding to said specific syslog entry, wherein the rule module is configured to generate a new rule to modify an existing behavior of the event handling device in response to a condition corresponding to the particular event associated with the specific syslog entry;

a syslog entry format database coupled to the rule module, wherein the syslog entry database comprises descriptions of a plurality of syslog entry formats, wherein the specific syslog entry is compared to the syslog entry format database to associate a particular syslog entry format with the specific syslog entry;

a causal database coupled to the rule module, wherein the causal database comprises a description of a problem behavior known to cause the specific syslog entry wherein the causal database comprises a plurality of causes each mapping to a corresponding rule template and wherein information parsed from a system log entry is associated with the cause for the system log entry; and a parser configured to parse information from the specific syslog entry based on the particular syslog entry format, wherein the rule module is configured to select a rule template based on the syslog entry format, the problem behavior and the system log entry information and to use the rule template to automatically generate the new rule to alter the existing behavior of the event handling device in response to the condition and to take a corrective action based on the automatically generated new rule when the condition next occurs.

2. The system of claim 1, further comprising:

a user interface, coupled to the system log file; and an input device, coupled to the user interface, wherein the user interface and the input device are configured to allow selection of the specific syslog entry.

3. The system of claim 2, wherein the input device comprises a computer mouse, and the selection comprises a single click of the computer mouse on a representation of the specific syslog entry.

4. The system of claim 1, further comprising:

a user interface, coupled to the system log file, wherein the rule module is configured to display the rule on the user interface, and the user interface is configured to allow the user to access and modify the rule.

5. A non-transitory computer-readable medium for storing executable instructions for automatic generation of a rule for governing an event handling device, the instructions operable to cause a computer to:

store a system log entry associated with an event;

determine a syslog entry format corresponding to the system log entry, wherein the syslog entry format is determined by comparing a database comprising a plurality of system log entry formats to the system log entry;

parse information from the system log entry according to the system log entry format;

determine a cause of the system log entry, wherein the cause is a condition corresponding to the system log entry associated with the event, determining the cause comprising:

accessing a causal database comprising a plurality of causes each mapping to one or more corresponding syslog entry formats; and searching the causal database using the information contained in the system log entry to determine the cause of the system log entry, wherein the information parsed from the system log entry is associated with the cause for the system log entry;

select a rule template based on the cause, wherein the cause is mapped to the rule template in the causal database; and automatically populate the rule template using the information parsed from the system log entry to generate a new rule, wherein the new rule modifies an existing behavior of the event handling device that caused the condition corresponding to the event associated with the syslog entry.

6. A method of rule generation for execution in an event handling device for monitoring data traffic in a computer network, comprising:

storing a system log entry created in response to an event in the computer network;

determining a system log format corresponding to the system log entry based on data in the system log entry wherein a syslog entry format is determined by comparing a database comprising a plurality of system log entry formats to the system log entry;

parsing information from the system log entry according to the system log entry format;

determining a cause of the event corresponding to the system log entry based on the system log format and the data in the system log entry wherein the cause is a condition corresponding to the system log entry associated with the event, wherein determining the cause includes:

accessing a causal database comprising a plurality of causes each mapping to one or more corresponding syslog entry formats; and searching the causal database using the information contained in the system log entry to determine the cause of the system log entry, wherein the information parsed from the system log entry is associated with the cause for the system log entry;

identifying a corrective action addressing the determined cause, wherein the corrective action corresponds to the determined cause; and automatically generating a rule for the event handling device to take the corrective action responsive to future occurrences of the event, wherein automatically generating the rule comprises selecting a rule template based on the cause and filling in the rule template based on the data in the system log entry.

7. The method of claim 6, wherein the determining a system log format further comprises:

accessing a system log format database; and using an identifier associated with the system log entry to locate system log format corresponding to the system log entry in the system log format database.

8. The method of claim 6, wherein the identifying corrective action further comprises:

using the cause of the system log entry to search the causal database for the rule template associated with the cause for the system log entry.

9. The method of claim 8, further comprising displaying and providing access to a suggested rule template on a user interface.

10. A network security device for monitoring traffic through a computer network comprising:

a system log module configured to generate a system log entry responsive to an event, error or misconfiguration, or combinations thereof in the computer network;

a processor configured to automatically generate a rule for handling the event, error or misconfiguration in the network based on data contained in the system log entry, wherein the rule identifies a corrective action to be implemented by the network security device to modify an existing behavior of the network security device that caused the event, error or misconfiguration, or combination thereof associated with the system log entry;

a lookup table for associating a format with the system log entry, wherein the format provides a context for the data contained in the system log entry based on positioning of the data within the system log entry;

a parser configured to extract the data from the system log entry and communicate the data to the processor, wherein the parser is further configured to parse the system log entry according to the format to identify the data contained in the system log entry;

a causal database comprising relationship data associating the data parsable from the system log entry with a cause of the event, error or misconfiguration, or combinations thereof wherein the cause is associated with the rule; and a rule module comprising a plurality of rule templates, wherein the rule module is configured to select a rule template based on the format, the cause and data and to use the rule template to automatically generate a new rule to modify the existing behavior of the network security device in response to a condition and to take a corrective action based on the new rule when the condition next occurs.

11. The network security device of claim 10, further comprising an input device in communication with the processor configured to receive an input indicating a selection of the system log entry.

12. The network security device of claim 10, wherein the rule corresponds to the context of the data.

13. A system for automatic rule generation for an event handling device comprising:
   an event handling device comprising memory and one or more processors for automatically handling events associated with operation of one or more computers, wherein respective syslog entries are created in response to corresponding ones of the events;
   a user interface for selecting one of the syslog entries;
   a rule module configured to automatically generate a rule for altering an existing behavior of the events handling device associated with a selected syslog entry wherein the selected syslog entry includes entry information and wherein the rule is based on the entry information;
   a syslog entry format database coupled to the rule module, wherein the syslog entry format database comprises descriptions of a plurality of syslog entry formats and associates a particular syslog entry format with the selected syslog entry;
   a parser configured to parse the entry information from the selected syslog entry based on the particular syslog entry format;
   a known behavior database wherein the rule module is configured to search the known behavior database using the entry information to determine a cause for the existing behavior and a rule template suggesting corrective action addressing the cause, wherein the rule module automatically generates the rule using the rule template, wherein the events handling device is configured to execute the rule altering the existing behavior of the events handling device in accordance with the rule in response to the cause.

14. The system of claim 13 wherein the corrective action reverses the existing behavior.

15. The system of claim 13 wherein the rule module is configured to enter the corrective action using the rule template having respective adjustable settings including by automatically populating certain ones of the adjustable settings using the entry information for the selected syslog entry and the corrective action stored in the known behavior database.

16. The system of claim 13 wherein the user interface includes a viewing interface to enable the user to view the automatically generated rule before the events handling device is reconfigured in accordance with the automatically generated rule.

17. The system of claim 13 wherein the user interface includes a viewing interface to enable the user to view and modify the automatically generated rule before the events handling device is reconfigured in accordance with the automatically generated rule.

18. The system of claim 13 wherein the user interface includes a viewing interface configured to generate a first screen portion enabling user viewing of a general listing of the respective syslog entries and a second screen portion enabling user viewing of the entry information for a syslog entry selected from the general listing.

19. The system of claim 18 wherein the rule module is configured to automatically generate the rule using a rule template having respective settings and the viewing interface is further configured to generate a third screen portion enabling user viewing of the respective settings of the rule template.

* * * * *

UNITED STATES PATENT AND TRADEMARK OFFICE
CERTIFICATE OF CORRECTION

| | | |
|---|---|---|
| PATENT NO. | : 7,818,274 B1 | |
| APPLICATION NO. | : 11/524725 | |
| DATED | : October 19, 2010 | |
| INVENTOR(S) | :Ottamalika | |

It is certified that error appears in the above-identified patent and that said Letters Patent is hereby corrected as shown below:

At column 13, line 35, please replace "suggesting" with --suggesting a--.

Signed and Sealed this
Eleventh Day of October, 2011

David J. Kappos
*Director of the United States Patent and Trademark Office*